United States Patent [19]

Hoyer

[11] 3,916,711
[45] Nov. 4, 1975

[54] CHANGE GEAR TRANSMISSION, ESPECIALLY FOR MOTOR VEHICLES USED FOR AGRICULTURAL PURPOSES AND THE CONSTRUCTION INDUSTRY

[75] Inventor: Manfred Hoyer, Bergisch Gladbach-Schildgen, Germany

[73] Assignee: Klockner-Humboldt-Deutz Aktiengesellschaft, Germany

[22] Filed: Aug. 13, 1973

[21] Appl. No.: 387,941

[30] Foreign Application Priority Data
Aug. 14, 1972  Germany ............................. 2239955

[52] U.S. Cl. .................... 74/360; 74/701; 74/745
[51] Int. Cl.² ... F16H 3/08; F16H 37/08; F16H 3/02
[58] Field of Search ............ 74/700, 701, 745, 360, 74/15.2

[56] References Cited
UNITED STATES PATENTS
2,158,320   5/1939   Bock ................................... 74/700
3,350,951   11/1967  Frost et al. ......................... 74/360
FOREIGN PATENTS OR APPLICATIONS
1,225,969   9/1966   Germany ............................ 74/745
1,071,494   12/1959  Germany ............................ 74/745
1,004,053   3/1957   Germany ............................ 74/700
557,807     2/1957   Italy .................................... 74/745

Primary Examiner—Samuel Scott
Assistant Examiner—P. S. Lall
Attorney, Agent, or Firm—Walter Becker

[57]   ABSTRACT

A change gear transmission, especially for agricultural and construction industry vehicles, in which a unidirectionally rotating input shaft is adapted for connection with a first counter shaft at a plurality of drive ratios for driving said counter shaft in a single direction while a second counter shaft is connected to be reversibly driven by said first counter shaft at a respective drive ratio in each direction while the second counter shaft is adapted to be connected to an output shaft to drive the output shaft at a plurality of drive ratios and in a respective direction for each direction of rotation of the second counter shaft. The transmission is, furthermore, provided with two power take-off shafts adapted for driving connection to the transmission.

17 Claims, 4 Drawing Figures

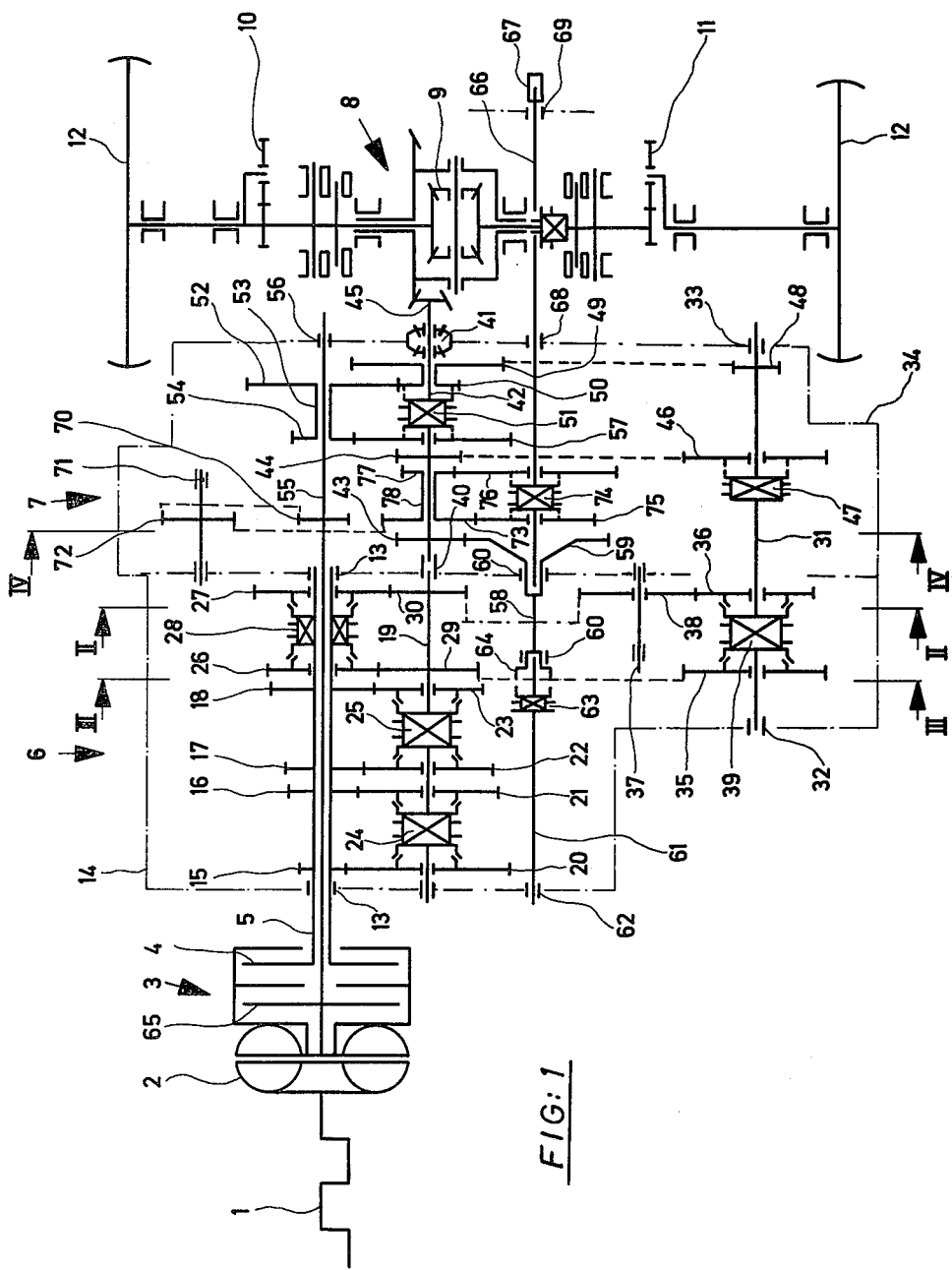
FIG:1

CHANGE GEAR TRANSMISSION, ESPECIALLY FOR MOTOR VEHICLES USED FOR AGRICULTURAL PURPOSES AND THE CONSTRUCTION INDUSTRY

The present invention relates to a change gear transmission with auxiliary transmission, especially for agricultural vehicles and/or motor vehicles for use in the construction industry, which is provided with a plurality of reverse speed stages and with an auxiliary transmission following the main transmission group, which auxiliary transmission comprises a counter shaft which is parallel to the output shaft and/or to a counter shaft of the main gear transmission.

With change gear transmissions of this type it has heretofore been the common practice to design the reverse speed stages as a back gearing which is arranged in the auxiliary transmission between the counter shaft and the output shaft. In this connection, the counter shaft is operable at the same time for forming the slow forward speed stage of the auxiliary transmission by a back gearing through the output shaft of the main transmission group or directly by the output shaft therefor. In view of this arrangement of the reversing back gearing of the auxiliary transmission, the considerable drawback is encountered with regard to the known change gear transmissions that all reverse speed stages which are preselectable are associated only with those forward speed stages which are obtainable with the slow forward speed stage of the auxiliary transmission in cooperation with the main transmission group. The reverse speed stages which are preselectable with such change gear transmissions are therefore, contrary to the desired use for a vehicle with a front and rear loader, not selectively so preselectable that they will be by approximately by from 20 to 30% higher than the reverse speed stages which are selectable with the associated slow forward speed stages. In addition thereto, with heretofore known change gear transmissions the possibility for such employment is lacking, namely to associate with a fast forward speed stage a reverse speed stage which has the same speed or is faster by 20% without the employment of means which require a considerable number of elements with regard to the transmission and which reduce the degree of efficiency.

Based on these findings, it is an object of the present invention to provide an improved change gear transmission of the above mentioned type with structurally simple means and with a simple transmission so that as far as possible each speed stage, which by means of the main transmission group is adapted to be shifted in cooperation with a forward speed stage of the auxiliary transmission, can have associated therewith an optimum reverse speed stage by means of the main speed group in cooperation with a reverse speed stage shiftable together with the auxiliary transmission. The reversing of the driving direction of the auxiliary transmission should be possible by means of a separate control lever or the like or by means of a control lever or the like which at the same time serves for controlling the forward speed stages of the auxiliary transmission.

These and other objects and advantages of the invention will appear more clearly from the following specification in connection with the accompanying drawings, in which:

FIG. 1 illustrates a diagrammatic longitudinal section through a gear change transmission according to the invention.

Figure 4:
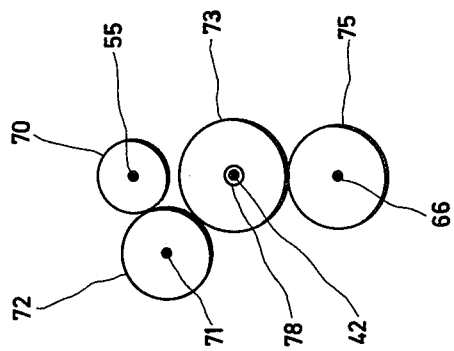
FIG. 4 is a cross section taken along the line IV—IV through the change gear transmission of FIGS. 1–3.

The gear change transmission according to the present invention is characterized primarily in that the counter shaft of the auxiliary transmission is driven directly by the output and/or the counter shaft of the main gear transmission selectively in forward direction as well as in reverse direction. In view of this design of the forward and reverse stages, it will be made possible in an advantageous manner that with simple means as far as the transmission is concerned there is obtained the possibility to associate with the slow forward speed stage of the auxiliary transmission faster reverse speed stages which in their speed ranges are approximately by from 20 to 30% faster, or to associate reverse speed stages with the faster forward speed ranges of the auxiliary transmission which reverse speed stages have an equal speed or are higher by approximately 20%. In view of this possibility of selecting the optimum forward and reverse speed stages, it is possible, especially during loading operations, to continuously adapt the forward and reverse speeds to the respectively present conditions of employment.

A gear change transmission which is simple in construction and simple in manufacture is, in conformity with a further development of the present invention, realized by arranging the counter shaft of the auxiliary transmission and the drive shaft of the main gear transmission pertaining to the output shaft and/or counter shaft thereof on a common pitch circle. A favorable design with regard to the manufacture of the reversing stages for the change gear transmission according to the invention has been realized by arranging the shaft of a reversing gear with the counter shaft of the auxiliary transmission on a common pitch circle, the shaft of the reversing gear being mounted between the counter shaft of the auxiliary transmission and the output shaft or the counter shaft of the main transmission group. For a particularly economic manufacture of the change gear transmission according to the invention it is furthermore expedient that the output shaft of the auxiliary transmission is in a manner known per se arranged coaxially with regard to the counter shaft or the output shaft of the main transmission group.

According to a further feature of the invention, it is provided that the change gear transmission is so designed that the counter shaft of the auxiliary transmission is adapted selectively to be driven by a step-down or step-up transmission and that this is effected by a gear exchange of one of its gears with the gear or output shaft or counter shaft of the main transmission group which gear or output shaft or counter shaft serves for the direct output. A change gear transmission which represents a further simplification in construction is created by the fact that the counter shaft of the auxiliary transmission comprises one gear which is drivable in forward direction and one gear which is drivable in reverse direction selectively by the output shaft and/or by the counter shaft of the main transmission group. These gears are freely rotatable and selectively engageable. This last mentioned design according to the invention is furthermore characterized in that the counter shaft of the auxiliary transmission comprises an additional freely rotatable gear which is selectively adapted to be coupled to the last mentioned counter shaft, while the last mentioned two gears mesh with an associated non-rotatable or freely rotatable gear that is selectively adapted to be coupled to the output shaft of the auxiliary transmission.

If the change gear transmission according to the present invention is provided with an auxiliary drive shaft which is arranged coaxially with regard to the drive shaft of the main transmission group and is adapted to be driven in conformity with the speed of the driving engine, and is furthermore provided with a power take-off shaft adapted to be driven by the auxiliary shaft through back gearing, it is provided according to the invention that the output shaft of the auxiliary transmission serves as mounting for a gear of the back gearing of the power take-off shaft. In this connection it is expedient that the power take-off shaft and the drive shaft of the main transmission group are with regard to the output shaft of the main transmission group and/or the counter shaft therefor arranged on a common pitch circle. If the change gear transmission for the drive of the power take-off shaft has a back gearing designed as a multi-stage back gearing, it is provided according to the invention that the gears for forming the speed stages of the multi-stage back gearing are arranged on the output shaft of the auxiliary transmission and on the power take-off shaft. In this connection it is expedient that the multi-stage back gearing of the drive for the power take-off shaft comprises a gear which is freely rotatably mounted on the output shaft of the auxiliary transmission and a gear which is non-rotatably connected to the last mentioned gear and differs therefrom in diameter. The gear change transmission according to the last mentioned design is furthermore characterized in that the last mentioned two gears mesh with gears which are associated with the last mentioned two gears and are freely rotatable on the power take-off shaft and are selectively adapted to be coupled thereto. In addition thereto it is advantageous that the gears of the back gearing of the power take-off drive which are mounted on the output shaft are located between the main transmission group and the gears of the auxiliary transmission.

A particularly favorable solution for a selectively stroke-dependent auxiliary drive is, in conformity with the present invention, created by the fact that the output shaft of the auxiliary transmission, between the gear mounted thereon or the gears mounted thereon and pertaining to the power take-off shaft drive driven in conformity with the speed of the driving engine and the main transmission group, comprises a gear which is used for the stroke-dependent drive, the last mentioned gear meshing with the gear of an auxiliary shaft which gear is coaxially arranged with regard to the power take-off shaft. In this connection a particularly favorable economic solution is obtained due to the fact that the gear of the auxiliary shaft, which gear serves as stroke-dependent drive, is arranged on an intermediate shaft which is selectively adapted to be coupled to a front or rear power take-off shaft drive or the like, for instance a front shaft drive.

Figure 3:
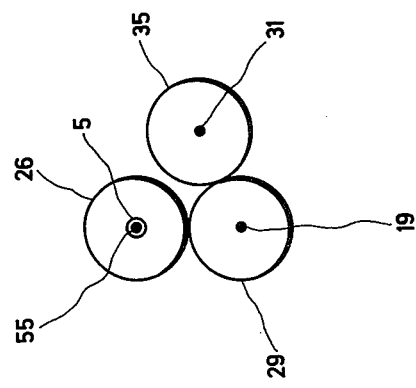
FIG. 3 represents a cross section taken along the line III—III through the gear change transmission of FIGS. 1 and 2.
Figure 2:
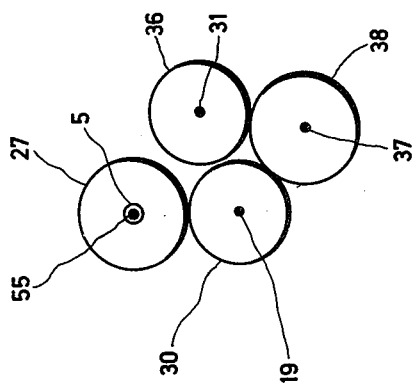
FIG. 2 is a cross section taken along the line II—II of FIG. 1.

Referring now to the drawings in detail, the change gear transmission illustrated in FIGS. 1–4 is driven by the crankshaft 1 of an internal combustion engine (not shown) through the intervention of a hydrodynamic coupling 2 and a friction clutch which is non-rotatably connected thereto and is adapted to be engaged and disengaged, said friction clutch being designed as a double clutch 3. The double clutch 3 has a follower 4 which is non-rotatably and axially displaceably mounted on a hollow driving shaft 5 for a main transmission group 6 of the change gear transmission. The main transmission group 6 is followed by a multi-stage auxiliary transmission 7 which through an axial shaft drive 8 drives a driving axle differential 9 which, in turn, through the intervention of a planetary gear transmission 10, 11, respectively drives a first driving gear 12 and a second driving gear 12.

The drive shaft 5 of the main transmission group 6 is at both ends journaled in a bearing 13 of the housing 14 (indicated in dot-dash lines) of the main transmission group 6. Non-rotatably mounted on the driving shaft 5 are gears 15–18 which mesh with gears 20, 21, 22, 23, associated therewith and freely rotatable on a counter shaft formed by the output shaft 19 of the main transmission group 6. Between the gears 20, 21 and 22, 23 there is arranged a double control sleeve 24, 25 equipped with synchronizing elements. By means of the sleeves 24 and 25 it is possible to control the speed stages I–II; III and IV of the main transmission group 6. Freely rotatably mounted on the drive shaft 5 is, behind the gear 18 (when viewing in the direction of the power flow), freely rotatably arranged a gear 26 and an adjacent freely rotatable gear 27. The gears 26 and 27 are adapted selectively to be coupled to the drive shaft 5 by means of a double control sleeve 28 which is arranged between the gears 26 and 27 and is mounted on the drive shaft 5 while being provided with synchronizing elements. The gear 26 in cooperation with a non-rotatable gear 29 of the output shaft 19 of group 6 serves for forming the speed stage V of the main transmission group 6, said gear 26 meshing with gear 29. On the other hand, the gear 27 in combination with a non-rotatable gear 30 of output shaft 19 forms the speed stage VI of the main transmission group, said gear 27 meshing with gear 30.

The two gears 29, 30, non-rotatably connected to output shaft 19 of the main transmission group 6 are, in conformity with the invention, provided for the selectively direct drive of a counter shaft 31 of the transmission group 7 in the forward and reverse driving direction respectively. The counter shaft 31 is, in this instance, for a particularly simple production of the housing of the gear transmission with regard to the output shaft 19 of the main transmission group 6 with the output shaft 5 thereof, with the drive shaft 5 arranged on a common pitch circle. As bearing for the left-hand end of the counter shaft 31, a bearing 32 is provided in the housing 14 of the main control group 6. The mounting of the right-hand end of the counter shaft 31 is effected in a bearing 33 provided in the housing 34 of the transmission 7, which housing is indicated by dot-dash lines.

The direct drive of the counter shaft 31 of the group transmission 7 is effected in forward driving direction through the intervention of a gear 35 which is freely rotatably journaled on shaft 31. Gear 35 meshes with gear 29 of the output shaft 19 of the main group 6. For the reverse drive of the counter shaft 31, a gear 36 is freely rotatably journaled on shaft 31 in the vicinity of the gear 35. Gear 36 is driven by means of a gear 38 journaled on a reversing shaft 37, directly by the gear 30 of output shaft 19 which gear 30 meshes swith gear 38.

The selective engagement of the drive of counter shaft 31 in forward and reverse driving direction is effected by means of a double control sleeve 39 which is non-rotatably and axially displaceable on said counter shaft 31 and is mounted between the two gears 35 and 36 while being provided with synchronizing means.

In addition to the above mentioned structural elements, the transmission 7 has an output shaft 42 which is located coaxially with regard to the output shaft 19 of the main transmission group 6 on the left-hand side in a bearing 40 and on the right-hand side in mutually supported conical roller bearings 41. The output shaft 42 has gears 43, 44 non-rotatably mounted thereon and has a non-rotatable conical gear wheel 45 for driving the axial shaft drive 8. The gear 44 meshes with a gear 46 which is freely rotatable on the counter shaft 31. Gear 46 is, by means of a control sleeve 47 adapted to be selectively coupled to the counter shaft 31. The two gears 44 and 46 in cooperation with the gears 29, 35, 30, 36, 38 driving the counter shaft 31 form a fast forward control stage S or a fast reverse control stage RS associated therewith. For purposes of driving the output shaft 42 of the transmission 71 in a slow forward speed stage A or low reverse speed stage RA and also for driving the output shaft 42 in a reverse speed crawling stage RK, a gear 48 is non-rotatably mounted on the counter shaft 31. The gear 48 meshes with a gear 49 which is freely rotatable on the output shaft 42 of the transmission 7 and which through a hollow shaft section is connected to a gear 50. For purposes of engaging the forward speed stage A and the associated reverse speed stage RA, the gear 50 is, by means of a double control sleeve 51, selectively adapted to be coupled to the output shaft 42. This coupling action is possible by means of a double control sleeve 51 which is non-rotatably and axially displaceably arranged on the output shaft 42. For purposes of forming the forward and reverse crawling stage K, RK, there is in the transmission 7 provided a gear 52 of a crawl speed back gearing, which gear 52 meshes with the gear 50. This crawl speed back gearing is, through a hollow shaft 53, connected to a gear 54. The hollow shaft 53 is preferably journaled on an auxiliary drive shaft 55 which is arranged coaxially with regard to the drive shaft 5 of the main gear group 6. Shaft 55 in its turn is journaled in a bearing 56 of the transmission 7, or in the centrally located part of the hydrodynamic coupling 2. The gear 54 of the crawl speed back gearing meshes with a gear 57 which is freely rotatably journaled on the output shaft 42 of the group 7 and in the control stage K, RK, is, by means of the double control sleeve 51, coupled to the output shaft 42.

In addition to serving for driving the axle shaft drive 8, the output shaft 42 of the transmission 7 serves the ground speed dependent drive of an auxiliary shaft 58. The auxiliary shaft 58 has non-rotatably arranged thereon a gear 59 which meshes with the gear 43 of the output shaft 42. Both ends of the auxiliary shaft 58 are journaled in bearings 60 of the housing 14 of the main transmission group 6. The drive shaft 5 is, with the auxiliary shaft 58 toward the output shaft 42, arranged on a common pitch circle. Coaxially with said auxiliary shaft 58, further inwardly of the housing 14, there is arranged a front drive shaft 61 on the left-hand side in a bearing 62 and on the right-hand side in the auxiliary shaft 58. Axially displaceably and non-rotatably arranged on the front drive shaft 61 is a jaw clutch 63, by means of which, the front drive shaft 61 is adapted for purposes of engaging a front shaft drive to be coupled selectively to a follower 64 of an auxiliary shaft 58.

In addition to the described structural elements, the change gear transmission according to the invention has a power take-off shaft 66 which is adapted to be driven through the intervention of a follower 65 of double clutch 4 which follower is non-rotatably mounted on the auxiliary drive shaft 55, said shaft 66 being adapted selectively to be driven in conformity with the speed of the driving engine. The shaft 66 has a shaft end 67 and is mounted coaxially with regard to the auxiliary shaft 58 with its left end in said shaft 58 and with its right-hand end in a bearing 68 of housing 34 and in a bearing 69 of the not illustrated housing of the shaft drive 8. For driving the power take-off shaft 66, the auxiliary drive shaft 55 has non-rotatably connected thereto a gear 70 which meshes with a gear 72 which is mounted on an auxiliary shaft 71. As will be evident from FIG. 4, the auxiliary shaft 71, when viewed in counterclockwise direction is preferably arranged on the same pitch circle as the drive shaft 5 and the counter shaft 31 to the output shaft 19 of the main gear group. The gear 72 in its turn meshes with a gear 73 arranged preferably on the output shaft 42 of the transmission 7 between the gears 43 and 44. For driving the power output shaft 66 at a normal speed $n = 1,000$ revolutions per minute, there is freely rotatable thereon a gear 73 which, by means of a double sleeve 74, is adapted selectively to be coupled to said shaft 66. Gear 75 meshes with the gear 73. For purposes of driving the shaft 66 at a normal speed of $n = 540$ revolutions per minute, said shaft 66 has furthermore freely rotatably mounted thereon a gear 76 which is adapted selectively by means of the double sleeve 74 to be coupled to the shaft 66. The gear 76 meshes with a gear 77 which is freely rotatably mounted on the output shaft 42 of the transmission 7. The gear 77 is, by means of a hollow shaft portion 78, journaled on the output shaft 42 and is non-rotatably connected to the adjacent gear 73. It may be mentioned that for purposes of employing the transmission according to the present invention for a higher velocity range than approximately 25 kilometers per hour, the two gears 29 and 35 are to be so designed that a mutual exchange on their pertaining shafts, and thus a drive of the counter shaft 31 of the transmission 70 will be possible at a higher speed and the same driving speed of the output shaft 5 of the main transmission group 6. It may furthermore be mentioned that for the selective operation or drive of the front drive shaft 61, when using the same as front power output shaft, a selective coupling of the auxiliary shaft 58 to the shaft 66 or its gear 75 will be possible by installation of a corresponding jaw clutch, or the like. In this connection, a coupling will be necessary between the gear 43 and the output shaft 42 of the transmission 7 for separating the power flow.

For purposes of controlling the main transmission group 6, a single control lever may be used in customary manner which is guided in an H-shaped control guide in which the speed stages I, II; III and IV, and V, and VI are located opposite to each other. For shifting the transmission according to the invention from forward to reverse drive, it is expedient in combination with the double sleeve 39 to employ a separate control lever which may be guided in a straight control guide which is parallel to the central longitudinal axis of the vehicle. It is further expedient that for controlling the transmission 7 a separate control lever is provided which is guided in a T or L-shaped control coulisse. In this connection, it is advantageous that the faster speed stage A is located opposite the crawl stage K, whereas the fastest speed stage S is engaged by laterally tilting the control lever for the transmission 7. The speed steps A and K and the speed steps AR; KR are in cooperation with the separate shift lever shifted for shifting the double sleeve 39.

It is, of course, to be understood that the present invention is, by no means, limited to the specific showing in the drawings, but also comprises any modifications within the scope of the appended claims.

What is claimed is:

1. A change gear transmission, especially for agricultural and construction industry vehicles, comprising; a first multiple step transmission group having only one input shaft (5) and a first counter shaft (19), first meshing gears (15, 20; 16, 21; 17, 22; 18,23; 26,29; 27,30) on said shafts and first clutch means (24, 25, 28) operable for making said first meshing gears selectively effective for drivingly interconnecting said shafts at a plurality of drive ratios, a second multiple step transmission group having an output shaft (45) and a second counter shaft (31) parallel to the first counter shaft, second meshing gears (48, 49; 44, 46) including gears on said output shaft and second counter shaft and second clutch means (47, 51) operable for making said second gears selectively effective for drivingly interconnecting said output shaft and second counter shaft at a plurality of drive ratios and for reversible rotation of said output shaft during one and the same direction of rotation of said first counter shaft, third meshing gears (29, 35; 30, 38, 36) including gears on said first counter shaft and said counter shaft and third clutch means (39) operable for making said third gears selectively effective for drivingly interconnecting said counter shafts directly at a plurality of drive ratios and selectively for reversible rotation of said second counter shaft during rotation of said first counter shaft in one and the same direction.

2. A change gear transmission according to claim 1 in which said input shaft (5) and second counter shaft (31) are both parallel to said first counter shaft (19) and are spaced the same radial distance from said first counter shaft.

3. A change gear transmission according to claim 1 in which said third meshing gears include a train of three gears (30, 38, 36) of which one (30, 36) is mounted on each counter shaft, a further shaft (37) supporting the third one (38) of said three gears and parallel to said counter shafts, said further shaft being spaced equal radial distances from said counter shafts.

4. A change gear transmission according to claim 1 in which the output shaft (45) of said second transmission group is coaxial with the said first counter shaft (19) of said first transmission group.

5. A change gear transmission according to claim 1 in which said third meshing gears include a train of two gears (29, 35) with one of the two gears on each counter shaft, said two gears being of respectively different sizes and being interchangeable on said countershafts to vary the drive ratio between the said countershafts.

6. A change gear transmission according to claim 1 in which said third gears include a pair of gears (35, 36) rotatable on said second countershaft (31) and said third clutch means includes a clutch (39) for selectively connecting the gears of said pair to said second counter shaft, said third gears including gearing (29; 30, 38) for driving each of said pair of gears in a respective direction, said second gears including one gear (48) fixed to said second counter shaft and another gear (46) rotatable on said second counter shaft, said other gear meshing with a gear (44) fixed to said output shaft and said one gear (48) meshing with a further gear (49) rotatable on said output shaft, said second clutch means including a clutch (47) selectively operable to connect said other gear to said second countershaft and a clutch (51) selectively operable to connect said further gear to said output shaft.

7. A change gear transmission according to claim 1 which includes an auxiliary shaft (55) coaxial with said input shaft (5) and adapted for being driven in conformity with the speed of the input shaft, a power take-off shaft (66), and a geared transmission connecting said auxiliary shaft to said power take-off shaft and including a pair of gears (73, 77) rotatable on the said output shaft of said second transmission group, an additional gear pair of which one gear is fixed to said output shaft (43), an auxiliary output shaft (61), the other gear (59) of said additional gear pair being coaxial with said auxiliary output shaft and adapted to be coupled thereto, said auxiliary output shaft (61) being coaxial with said power take-off shaft (66), an intermediate shaft (58) fixed to said other gear of said additional gear pair and coaxial with and interposed between said auxiliary output shaft and said power take-off shaft, and clutch means (63) operable to clutch said intermediate shaft to said auxiliary output shaft.

8. A change gear transmission according to claim 1 in which the said third meshing gears include a pair of gears (29, 30) fixed to said first counter shaft (19) and forming elements of said first meshing gears whereby the said pair of gears can be driven by said first counter shaft by power supplied to said first counter shaft from said input shaft via that part of said first gears (15, 20; 16, 21; 18, 23) which does not include said pair of gears as elements or the said pair of gears can be driven by said input shaft via that part of the said first gears (26, 29; 27, 30) of which said pair of gears form elements.

9. A change gear transmission according to claim 1 which includes an additional gear pair (43, 59) of which one gear (43) is fixed to said output shaft (45), an auxiliary output shaft (61), the other gear (59) of said additional gear pair being coaxial with said auxiliary output shaft and adapted to be coupled thereto.

10. A change gear transmission according to claim 9 which includes an intermediate shaft (58) coaxial with said auxiliary output shaft (61) and fixed to said other gear (59) of said additional gear pair, and coupling means (63) for coupling said intermediate shaft to said auxiliary shaft.

11. A change gear transmission according to claim 1 which includes an auxiliary shaft (55) coaxial with said input shaft and adapted for being driven in conformity with the speed of the input shaft, a power take-off shaft (66), and a geared transmission (70, 72, 73, 77, 75, 76) connecting said auxiliary shaft to said power take-off shaft and including a pair of gears (73, 77) rotatable on the said output shaft (45) of said second transmission group.

12. A change gear transmission according to claim 11 in which said power take-off shaft (66) and said input shaft (5) are parallel to and radially equidistant from said first counter shaft (19).

13. A change gear transmission according to claim 12 in which said geared transmission for driving said power take-off shaft (66) includes gears (75, 76) on and selectively clutchable to said power take-off shaft and gears (73, 77) meshing therewith and rotatable on said output shaft.

14. A change gear transmission according to claim 11 in which said pair of gears (73, 77) of said geared transmission for connecting said auxiliary shaft (55) to said said power take-off shaft (66) which are rotatable on said output shaft (45) are in the form of a compound gear rotatable on said output shaft and two gears on the power take-off shaft mehsing with the compound gear and a clutch (74) for selectively clutching one or the other of the said two gears on said power take-off shaft thereto.

15. A change gear transmission according to claim 14 in which said compound gear (72, 77, 78) is mounted on said output shaft (45) between the said second gears (44, 49) pertaining to the said output shaft and said first transmission group.

16. A change gear transmission according to claim 15 which includes a further shaft (71) parallel to said auxiliary shaft (55) and said output shaft (45) and having a gear (72) thereon meshing with a gear (70) on said auxiliary shaft and with one part (73) of said compound gear, said further shaft and siad auxiliary shaft being radially equidistant from said first counter shaft (19).

17. In a change gear transmission; an input shaft (5) rotatable in one direction, an output shaft (45) rotatable in opposite directions and at a plurality of different speeds for a single speed of said input shaft, a first counter shaft (19) adjacent said input shaft and a second counter shaft (31) adjacent said output shaft, all of said shafts being parallel, first gearing (15, 20; 16, 21; 17, 22; 18, 23; 26, 29; 27, 30) connecting said input shaft with said first counter shaft operable to drive said first counter shaft in one direction and establishing a plurality of drive ratios between said input shaft and said first counter shaft, second gearing (29, 35; 30, 38, 36) connecting said first counter shaft with said second counter shaft for driving said second counter shaft in opposite directions and establishing at least one drive ratio between said first counter shaft and said second counter shaft in each direction of rotation of said second counter shaft, and third gearing (48, 49; 46, 44; 50, 52, 54, 57) connecting said second counter shaft with said output shaft for driving said output shaft in a respective direction for each direction of rotation of said second counter shaft, said third gearing establishing a plurality of drive ratios between said second counter shaft and said output shaft.

* * * * *